(12) United States Patent
Tanaka et al.

(10) Patent No.: US 9,066,015 B2
(45) Date of Patent: Jun. 23, 2015

(54) IMAGE CAPTURE DEVICE, METHOD FOR GENERATING IMAGE, INFRARED CAMERA SYSTEM, AND INTERCHANGEABLE LENS SYSTEM

(75) Inventors: Yukio Tanaka, Saitama (JP); Yukiko Shibata, Saitama (JP)

(73) Assignee: Nippon Avionics Co., Ltd., Tokyo (JP)

( * ) Notice: Subject to any disclaimer, the term of this patent is extended or adjusted under 35 U.S.C. 154(b) by 602 days.

(21) Appl. No.: 13/457,268

(22) Filed: Apr. 26, 2012

(65) Prior Publication Data
US 2012/0274779 A1 Nov. 1, 2012

(30) Foreign Application Priority Data
Apr. 28, 2011 (JP) ................................. 2011-101482

(51) Int. Cl.
| | |
|---|---|
| *H04N 5/33* | (2006.01) |
| *H04N 9/64* | (2006.01) |
| *H04N 9/083* | (2006.01) |
| *H04N 3/14* | (2006.01) |
| *H04N 5/335* | (2011.01) |
| *H04N 5/232* | (2006.01) |
| *H04N 5/365* | (2011.01) |
| *G03B 17/14* | (2006.01) |

(52) U.S. Cl.
CPC ............ *H04N 5/23287* (2013.01); *G03B 17/14* (2013.01); *H04N 5/3653* (2013.01); *G03B 2205/0015* (2013.01)

(58) Field of Classification Search
USPC .................................................. 348/41–180
See application file for complete search history.

(56) References Cited

U.S. PATENT DOCUMENTS

| | | | |
|---|---|---|---|
| 7,645,990 B2 | 1/2010 | Takemura et al. | |
| 2002/0126209 A1* | 9/2002 | Yamada et al. | ................ 348/219 |
| 2003/0137517 A1 | 7/2003 | Kondo et al. | |
| 2004/0252135 A1 | 12/2004 | Ono | |

(Continued)

FOREIGN PATENT DOCUMENTS

| | | |
|---|---|---|
| JP | 2001-506433 A | 5/2001 |
| JP | 2002-310804 | 10/2002 |

(Continued)

OTHER PUBLICATIONS

Office Action dated Dec. 16, 2014, issued in related Japanese Patent Application No. 2011-075285, with English translation (18 pages).

(Continued)

*Primary Examiner* — Joseph Ustaris
*Assistant Examiner* — Talha Nawaz
(74) *Attorney, Agent, or Firm* — Westerman, Hattori, Daniels & Adrian, LLP

(57) ABSTRACT

An image capturing device for generating images with precise luminance gradation regardless of variability in output levels between pixels. The image capturing device consists of an image shifting means for moving an image position on a light receiving surface, a differential calculating section for calculating the difference between output levels of the same pixels before and after image position movement, a summed level calculating section for sequentially summing the difference in output level for each pixel in pixel lines arrayed in the direction of movement of the image position to calculate the summed level of each pixel, and an image generating section for generating images based on the summed levels of each pixel.

14 Claims, 14 Drawing Sheets

(56) References Cited

U.S. PATENT DOCUMENTS

| | | | |
|---|---|---|---|
| 2006/0072044 A1* | 4/2006 | Kawamura et al. | 348/797 |
| 2007/0071433 A1* | 3/2007 | Kawanami | 396/127 |
| 2007/0071434 A1* | 3/2007 | Kawanami | 396/127 |
| 2008/0099679 A1* | 5/2008 | Takemura et al. | 250/332 |
| 2008/0267454 A1 | 10/2008 | Kobayashi et al. | |
| 2009/0273675 A1 | 11/2009 | Jonsson | |
| 2010/0188532 A1* | 7/2010 | Kusaka et al. | 348/240.99 |
| 2011/0025875 A1 | 2/2011 | Imade | |
| 2011/0102742 A1* | 5/2011 | Miyasa et al. | 351/206 |
| 2011/0273608 A1 | 11/2011 | Tsukada | |
| 2012/0133786 A1 | 5/2012 | Watanabe et al. | |
| 2012/0154626 A1* | 6/2012 | Hatakeyama et al. | 348/223.1 |
| 2012/0176505 A1* | 7/2012 | Kim et al. | 348/222.1 |
| 2012/0249799 A1* | 10/2012 | Shibata | 348/164 |
| 2013/0021484 A1 | 1/2013 | Sorek et al. | |
| 2013/0147797 A1 | 6/2013 | Tanaka | |

FOREIGN PATENT DOCUMENTS

| | | |
|---|---|---|
| JP | 2003-116042 A | 4/2003 |
| JP | 2007-104445 A | 4/2007 |
| JP | 2008-111754 | 5/2008 |
| JP | 2008-203054 | 9/2008 |

OTHER PUBLICATIONS

Office Action dated Feb. 3, 2015, issued in corresponding Japanese Patent Application No. 2011-101482, with English translation (7 pages).

U.S. Office Action dated Jan. 16, 2015, issued in U.S. Appl. No. 13/434,661 (21 pages).

* cited by examiner

FIG. 13
(a)
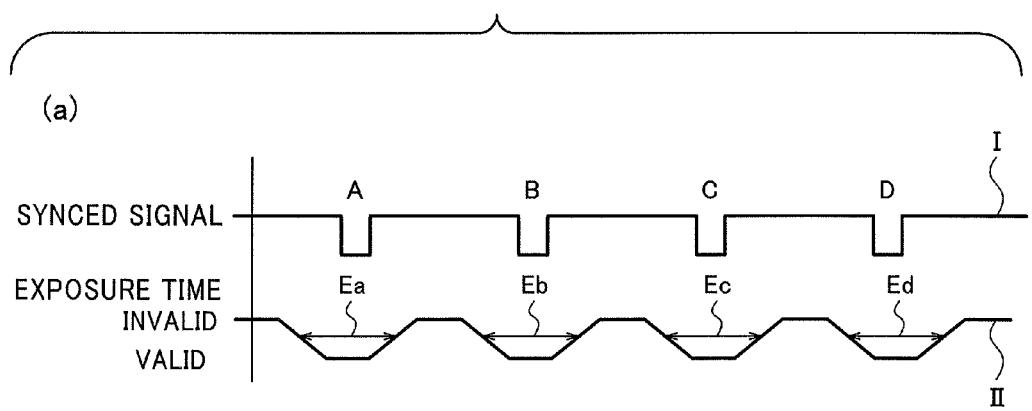
(b)
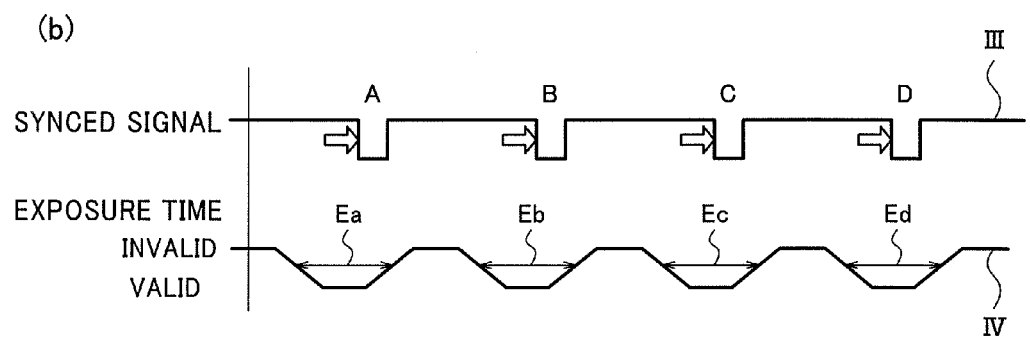

IMAGE CAPTURE DEVICE, METHOD FOR GENERATING IMAGE, INFRARED CAMERA SYSTEM, AND INTERCHANGEABLE LENS SYSTEM

CROSS-REFERENCE TO RELATED APPLICATIONS

The present patent application claims priority from Japanese Patent Application No. 2011-101482, filed Apr. 28, 2011, which is incorporated herein by reference in its entirety.

TECHNICAL FIELD

The present invention pertains to an image capturing device, and more particularly to an image capturing device, image generating method, infrared camera system, and interchangeable lens system for generating high precision luminance-graded images regardless of the variability of output levels between pixels.

BACKGROUND ART

Examples of conventional image capturing devices are set forth in Patent Citations 1 through 3 below. In the infrared image capturing devices set forth in Patent Citations 1 through 3, a reference image is obtained by closing a correction shutter; the level of variability in output levels among pixels when capturing this reference image is obtained, and this is corrected.

PRIOR ART REFERENCES

Patent References

Patent Citation 1: Published Unexamined Patent Application 2002-310804
Patent Citation 2: Published Unexamined Patent Application 2008-111754
Patent Citation 3: Published Unexamined Patent Application 2008-203054

DISCLOSURE OF THE INVENTION

Problems the Invention Seeks to Resolve

It can occur even in devices in which the image capturing elements forming each pixel in the light-receiving surface of an image capturing device have a high luminance gradation detection sensitivity that image noise stemming from the variability in output levels between pixels is greater than the difference in output levels caused by luminance differences of the target imaged object. In such cases it is difficult to detect luminance differences less than the variability in output levels between pixels. As a result, the precision of the luminance gradation of the image captured by the image capturing device drops to below the luminance gradation detection accuracy of the individual image capturing elements.

On the other hand, as in the conventional art, various problems arise when a correction shutter is closed to correct variability of output levels among pixels. For example, it is not possible to capture the image of an imaged object during the time the correction shutter is shut. Therefore when these conventional image capturing devices are used as monitor cameras, as in security cameras and the like, the problem arises that events occurring during the period when the correction shutter is closed, however short in duration, cannot be captured. Also, because conventional image capturing devices cannot output newly captured movie frames while a correction shutter is closed, the problem arises that the movie is interrupted.

The present invention therefore has the object of providing an image capturing device, and more particularly an image capturing device, image generating method, infrared camera system, and interchangeable lens system for generating high precision luminance-graded images regardless of the variability in output levels between pixels.

Means for Resolving the Problem

In order to achieve the above objective, the image capturing device of the present invention comprises an image capturing means having a light-receiving surface arrayed on which are pixels composed of image capturing elements for outputting electrical signals at output levels responsive to received light intensity; optics capable of forming images of an imaged object on the light-receiving surface; an image shifting means for moving the position of an image on the light-receiving surface; and an image processing means for processing images captured by the image capturing means; wherein the image capturing means captures the respective images on the light-receiving surface before and after movement of the image position by the image shifting means; the image processing means has: a difference calculating section for calculating a difference between the output levels of same pixels before and after moving the image position; a summed level calculating section for sequentially summing output level differences for each pixel in a pixel line arrayed in the direction of image movement to calculate a summed level of each pixel; and an image generating section for generating images based on the summed levels of each pixel rather than the output levels of each pixel.

In the image capturing device of the present invention, image capturing is done before and after the image position is moved relative to the light-receiving surface. As a result, the same pixels receive light for an image part equal to two pixels adjacent in the direction of image position movement. The difference between output levels before and after movement of the same pixel corresponds to the luminance difference in the image portion for which the two adjacent pixels respectively receive light. The difference between output levels from the same pixels does not relate to the variability in output levels between pixels. Therefore the difference in luminance between two adjacent pixels is calculated as the difference between output levels from the same pixel, regardless of the variability in output levels between pixels. Pixel noise caused by variability of output level between pixels can therefore be reduced, and detection is possible down to the level of tiny luminance differences in the imaged object corresponding to output level differences smaller than this noise.

Furthermore, a summed level for each pixel is calculated by adding up differences calculated without regard for the variability in output levels between pixels. The summed level for each pixel corresponds in substance to the output level of each pixel. Therefore a high precision luminance gradation image can be generated regardless of inter-pixel output level variability by generating an image based on the summed level of each pixel rather than the actual output level of each pixel.

In the present invention, preferably, the image processing means further has a correction section for correcting the summed level of each pixel so that the average value of the output level of each pixel in at least part of the area of the light-receiving surface is the same as the average value of the summed level of each pixel in the at least part of the area of the light-receiving surface.

An error is included in the difference of the output levels of each pixel. Therefore an error consisting of summed differences is contained in the summed level of each pixel. Therefore the error included in the summed level of each pixel can be removed by correcting so that the average value of actual output levels match the average value of the summed levels.

In the present invention, preferably, the image shifting means returns the image position back to a pre-movement image position after movement of the image position; the image capturing means once again captures the image on the light-receiving surface after returning the image position to the pre-movement image position; the image processing means calculates an amount of change in output levels for the same pixels before moving and after restoring the image position; and the summed level calculating section calculates a summed level, excluding a difference for a pixel having an amount of change equal to or greater than a predetermined reference value.

When an imaged object moves, it can occur that the difference in calculated pixel output levels does not accurately reflect differences in output levels stemming from variability in the output characteristics of the pixels themselves. It is therefore desirable that the difference between pixels receiving light from the image portion corresponding to the moving portion of the imaged object be excluded from the calculation of the summed level. Thus the image portion in which the amount of change in output level prior to moving the image position vs. after the image position is restored is removed as the portion in which the imaged object is moved. It is thus possible to prevent the summed level from becoming inaccurate.

In the present invention, preferably, the image capture means has a light-receiving surface on which pixels are arrayed in a two dimensional matrix; the image shifting means respectively causes image positions to move in a first alignment direction on the light-receiving surface and in a second alignment direction perpendicular to the first alignment direction; the difference calculating section calculates a first difference between the output levels of same pixels before and after movement of the image position in the first alignment direction, and calculates a second difference between the output levels of same pixels before and after movement of the image position in the second alignment direction; the difference calculating section sequentially sums the first differences in output levels from each pixel to calculate a first summed level for each pixel with respect to a first pixel line arrayed in the first alignment direction, and sequentially sums the second differences in output levels from each pixel to calculate a second summed level for each pixel with respect to a second pixel line arrayed in the second alignment direction; the image generating section generates images based on the first and second summed levels of each pixel.

An image is thus generated based on a first and second summed level, respectively calculated for a first and second alignment direction, therefore error in summed levels can be reduced.

Note that when moving the respective image positions in the first and second alignment directions, the path of movement from pre-movement image position to post-movement image position is not considered. For example, it is also acceptable to move from a pre-movement position temporarily to a third position, then move to the post-movement position.

In the present invention, preferably, the image shifting means moves the image position translationally so that the track of any given point in an image on the light-receiving surface describes a circular orbit on the light-receiving surface; the image capturing means respectively captures images on the light-receiving surface before and after a given point of the image moves in a predetermined part of the circular orbit; the difference calculating section calculates the difference in output levels between same pixels before and after a given point in the image moves over the predetermined part of the circular orbit; the summed level calculating section calculates a summed level of each pixel, as the direction of movement of the image position, the straight line direction connecting respective positions of any given point in the image when capturing an image, before and after moving the given points over the predetermined part of the circular orbit.

An image position can thus be continuously moved by moving the image position so as to cause its trajectory to describe a circular orbit. It is therefore easy to attain positioning accuracy for the image position.

In the present invention, preferably, the image shifting means moves the image position so that any given point in the image on the light-receiving surface makes a continuous constant velocity circular movement.

An image position can thus be stably moved by moving the image position at a continuous uniform velocity. Corrections can also be easily implemented in each cycle of the circular movement of the image position.

In the present invention, preferably, the image capturing means and the image processing means comprise an image capture device main unit; the optics and image shifting means comprise a lens unit detachable from the image capture device main unit; the image capture device main unit outputs data including pixel spacing on the light-receiving surface to the lens unit; and the image shifting means moves the image position based on the data.

Pixel spacing on the light-receiving surface normally differs depending on the type of image capturing device main unit. An image shifting means built into a lens unit such as an interchangeable lens is capable of matching the amount of image position movement to the pixel spacing on the light-receiving surface of the image capturing device main unit based on data which includes pixel spacing, sent from the image capturing device main unit.

In the present invention, preferably, the image capturing means outputs a sync signal in sync with the timing at which images on the light-receiving surface are captured; and the image shifting means moves the image position based on the sync signal.

Accurate correction can thus be achieved by matching image position movement and image capture timing.

In the present invention, preferably, the image shifting means outputs a sync signal in sync with the timing at which the image position is moved; and the image capturing means captures an image on the light-receiving surface based on the sync signal.

Accurate correction can thus be achieved by matching image position movement and image capture timing.

In the present invention, preferably, the image capturing element is a bolometer or a microbolometer.

Constituting the image capturing element by a bolometer or microbolometer enables the image capturing device of the present invention to capture infrared images.

The method of the present invention for generating image in an image capture device with a light-receiving surface arrayed on which are pixels comprising image capturing elements for outputting electrical signals at an output level responsive to received light intensity, and optics capable of forming an image of a photographed subject on the light-receiving surface, comprises: moving a image position on the light-receiving surface; capturing respective images on the light-receiving surface before and after image movement; calculating a difference between the output levels of same pixels before and after moving the image position; sequentially summing output level differences for each pixel in a pixel line arrayed in the direction of image movement to calculate a summed level of each pixel; and generating images based on the summed levels of each pixel rather than the output levels of each pixel.

Using the image generating method of the present invention, high precision luminance-graded images can be generated without regard to variability in output levels between pixels, as described for the image capturing device of the present invention.

An infrared camera system of the present invention comprises: an image capturing means having an light-receiving surface, arrayed on which are pixels composed of image capturing elements for outputting electrical signals at output levels responsive to received infrared radiation intensity; optics capable of forming images of an imaged object on the light-receiving surface; an image shifting means for moving an image position on the light-receiving surface; and an image processing means for processing images captured by the image capturing means; wherein the image capturing means captures the respective images on the light-receiving surface before and after movement of the image position by the image shifting means; the image processing means has: a difference calculating section for calculating a difference between the output levels of same pixels before and after moving the image position; a summed level calculating section for sequentially summing output level differences for each pixel in a pixel line arrayed in the direction of image movement to calculate the summed level of each pixel; and an image generating section for generating images based on the summed levels of each pixel rather than the output levels of each pixel.

An infrared image with a precise luminance gradation can thus be generated regardless of the variability in output levels between pixels.

The interchangeable lens system of the present invention comprises: an image capturing device main unit; and a lens unit removable from the image capturing device main unit; wherein the image capture device body includes: an image capturing means having a light-receiving surface arrayed on which are pixels composed of image capturing elements for outputting electrical signals at output levels responsive to received light intensity; and an image processing means for processing images captured by the image capturing means; wherein the lens unit includes: optics capable of forming images of an imaged object on the light-receiving surface; and an image shifting means for moving an image position on the light-receiving surface; wherein the image capturing means captures the respective images on the light-receiving surface before and after movement of the image position by the image shifting means; the image processing means has: a difference calculating section for calculating a difference between the output levels of same pixels before and after moving the image position; sequentially summing output level differences for each pixel in a pixel line arrayed in the direction of image movement to calculate the summed level of each pixel; and an image generating section for generating images based on the summed levels of each pixel rather than the output levels of each pixel.

Thus in an interchangeable lens system, images with precise luminance gradation can be generated regardless of the variability in output levels between pixels.

Effect of the Invention

Thus, according to the image capturing device, image generating method, infrared camera system, and interchangeable lens system of the present invention, images with precise luminance gradation can be generated without regard for the variability of output levels between pixels.

BRIEF DESCRIPTION OF FIGURES

FIG. 13: (a) and (b) are timing charts showing the relationship between the sync signal and exposure time.

OPTIMAL EMBODIMENTS OF THE INVENTION

Figure 1:
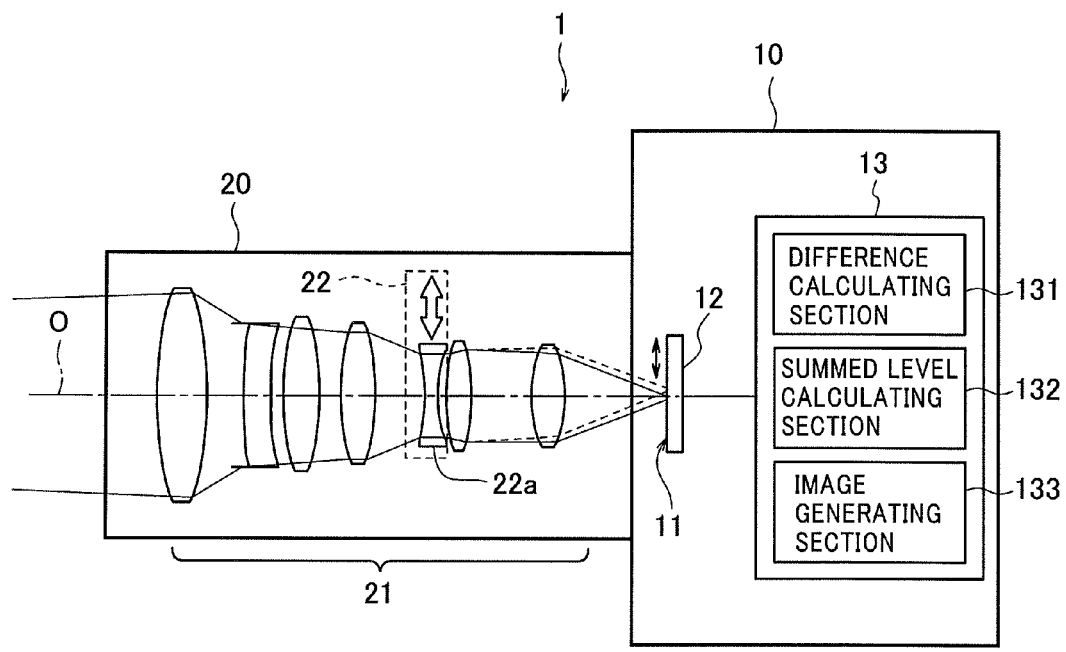
FIG. 1: A block diagram explaining the constitution of an image capturing device according to an embodiment of the present invention.

Below, referring to the attached drawings, we discuss embodiments of the image capturing device and image generating method of the present invention. First, referring to the block diagram in FIG. 1, we explain an image capturing device in an embodiment. The image capturing device 1 shown in FIG. 1 comprises a camera body 10 and a lens unit 20. The lens unit 20 may be an interchangeable lens attachable/detachable from the camera body 10.

The camera body 10 is furnished with an image capturing means 12 having a light-receiving surface 11, on which are arrayed pixels comprising image capturing elements for outputting electrical signals at output levels responsive to received light intensity, and an image processing means 13 for processing images captured by the image capturing means 12. The light-receiving surface of the image capturing means 12 may be constituted as a bolometer array or a microbolometer array for detecting infrared. It may also be constituted as a solid image capturing element array such as a CCD (Charge Coupled Device) image sensor or a CMOS (Complementary Metal Oxide Semiconductor) image sensor.

The lens unit 20 is furnished with optics 21 capable of focusing the image of a imaged object, and an image shifting means 22 for moving an image position on the light-receiving surface 11. The image shifting means 22 may consist of an anti-vibration mechanism. In the example shown in FIG. 1, the image shifting means 22 moves the image position relative to the light-receiving surface 11 by translationally moving one of the lenses 22a comprising the optics 21 in a direction perpendicular to the optical axis O of the optics 21.

Note that the entire image within the image capture field is included in the photographed object.

Note that the image shifting means 22 may also be constituted to translationally move the entire optics 21 in a direction opposite the optical axis O, and the light-receiving surface 11 may be constituted to translationally move the light-receiving surface 11 within a plane perpendicular to the optical axis O.

The camera body 10 image capturing means 12 captures the respective images on the light-receiving surface 11 before and after movement of the image position by the image shifting means 22. Images captured by the image capturing means 12 are processed by the image processing means 13.

The image processing means 13 includes a difference calculating section 131, a summed level calculating section 132, and an image generating section 133. The difference calculating section 131 calculates the difference between same pixel output levels before and after moving the image position at time of image capture. The summed level calculating section 132 calculates summed levels for each pixel by sequentially summing the differences in output levels of each pixel relative to a pixel line arrayed in the direction of movement of the image position. And the image generating section 133 generates images based on the summed level of each pixel rather than on the output levels of each pixel.

First Operating Example

Figure 2:
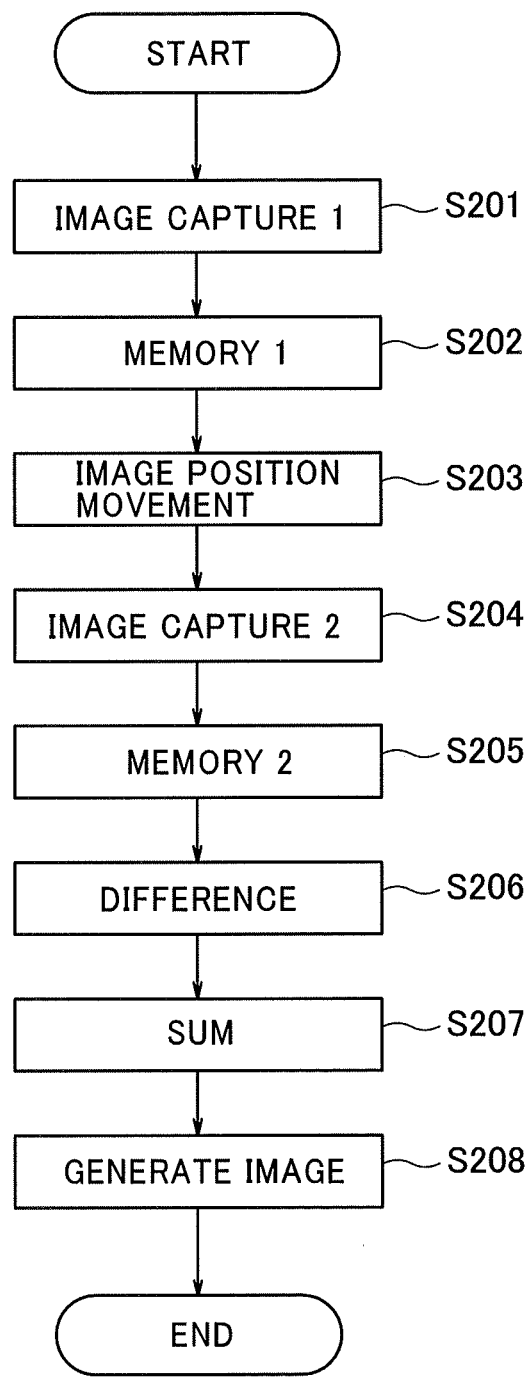
FIG. 2: A flow chart explaining a first operating example of an image capturing device according to an embodiment of the present invention.

Referring to the FIG. 2 flow chart, we discuss a first operating example of the image capturing device 1 according to the present embodiment.

Figure 3:
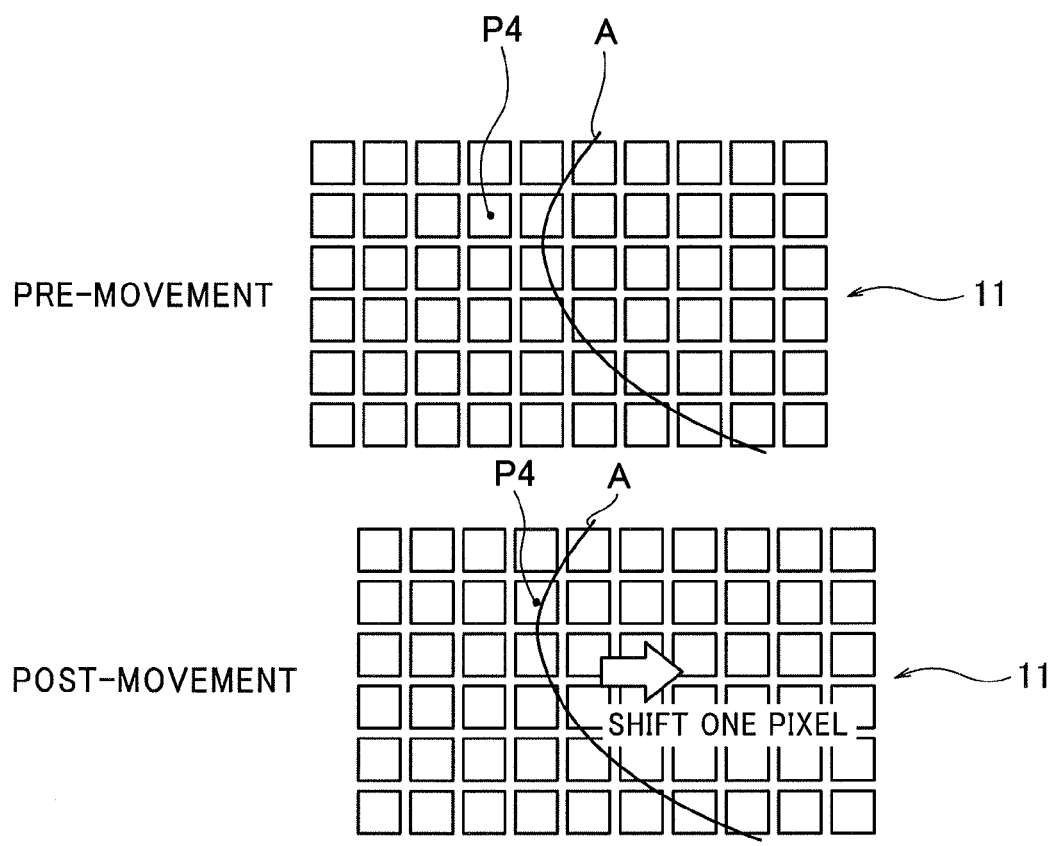
FIG. 3: (a) is a diagram showing the positional relationship between the light-receiving surface and the image before and after moving the image position.

First, prior to movement of the image position by the image shifting means 22, the image capturing means 12 captures an image on the light-receiving surface 11 (S201). Here the top portion of FIG. 3 shows an example of an image on the light-receiving surface 11 prior to image movement. The light-receiving surface in FIG. 3 is made up of pixels arrayed in a two dimensional matrix. In FIG. 3, the dark/light boundary of the image formed on the light-receiving surface 11 is indicated by "A."

Next, the output levels of each pixel in the image captured prior to image movement are stored in a first image memory (S202). A first image memory is provided in the camera body 10.

Next, the image shifting means 22 moves the image position in the pixel alignment direction by a distance equal to a pixel interval (1 pixel pitch) on the light-receiving surface 11 (S203). The bottom portion of FIG. 3 shows an example of an image on the light-receiving surface 11 after image movement. FIG. 3 shows the appearance after the light-receiving surface 11 perpendicular to the optical axis O is moved rightward by 1 pixel pitch relative to the image. This movement corresponds to moving the image position by 1 pixel pitch to the left relative to the light-receiving surface 11.

Next, after movement of the image position by the image shifting means 22, the image capturing means 12 captures the image on the light-receiving surface 11 (S204). Comparing the top and bottom portion of FIG. 3, pixel P4 on light-receiving surface 11 is positioned on the left side of the light/dark boundary A prior to movement, and is positioned on the light/dark boundary A after movement. Similarly, after movement of the image position, each pixel receives light for the image for which light had been received prior to movement by the respective right adjacent pixels, over the entire light-receiving surface.

Next, the output levels of each pixel in the image captured after image movement are stored in a second image memory. The second image memory is provided in the camera body 10 (S205).

Next, the difference calculating section 131 in the image processing section 13 calculates the difference between same pixel output levels before and after moving the image position at time of image capture. For example, a calculation is made of the difference between the output level of the pre-image movement pixel P4 stored in the first pixel memory and the post-movement pixel P4 stored in the second pixel memory (S206). A difference is similarly calculated for each pixel.

Note that the difference in the output levels of each pixel may be calculated by subtracting the pre-image movement output level from the post-image movement output level, or by subtracting the post-image movement output level from the pre-image movement output level.

The difference between output levels before and after movement of the same pixel corresponds to the luminance difference in the image portion for which two adjacent pixels respectively receive light. The difference between output levels from the same pixels does not relate to the variability in output levels between pixels. Therefore the difference in luminance between two adjacent pixels is calculated as the difference between output levels from the same pixel, regardless of the variability in output levels between pixels. Pixel noise caused by variability of output levels between pixels can therefore be reduced, and detection is possible down to the level of tiny luminance differences in the imaged object corresponding to output level differences smaller than this noise.

Figure 4:
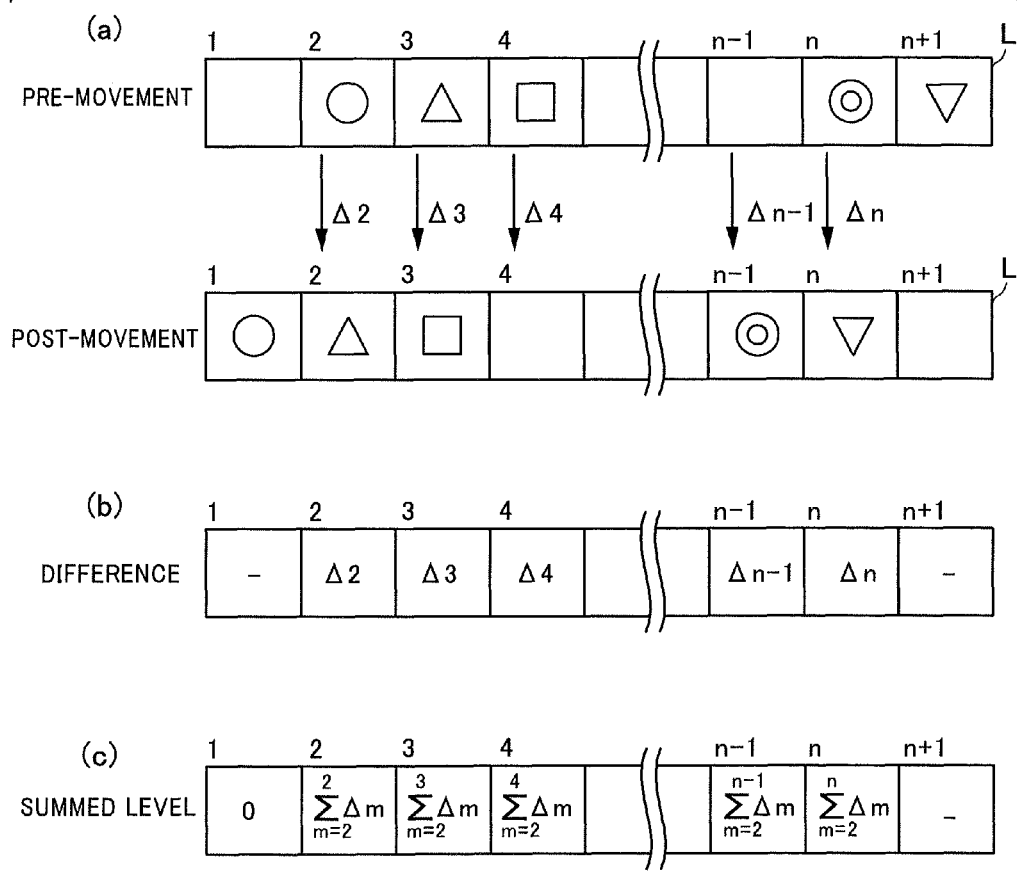
FIG. 4: (a) is a diagram showing the relationship between pixels in a pixel line and the light receiving part of an image, before and after moving the image position by one pixel pitch; (b) is a diagram showing the difference in the pixel line; and (c) is a diagram showing summed levels on the pixel line.

Referring to FIG. 4, we discuss in more detail the calculation of output levels for a single pixel before and after image movement. FIG. 4(a) schematically depicts a single pixel line L on the light-receiving surface 11. This pixel line L comprises a $1^{st}$ pixel through $n^{th}$ pixel, arrayed in sequence from left to right. The top part of FIG. 4(a) schematically shows the part of an image for which light is received by each pixel in the pixel line L prior to movement of the image position. As shown in the top part of FIG. 4(a), the second pixel in the pixel line L receives light for the "○" portion of the image; the third pixel receives light for the "△" portion of the image; the fourth pixel receives light for the "□" portion of the image; similarly, the $n^{th}$ pixel receives light for the "⊚" part of the image, and the $(n+1)^{th}$ pixel receives light for the "∇" part of the image.

The bottom part of FIG. 4(a) shows the part of the image for which light is received by each pixel in the pixel line after the image position is moved to the left by one pixel pitch along the direction of alignment of the pixel line L. As shown in the bottom part of FIG. 4(a), the first pixel in the pixel line L receives light from the "○" part of the image; the second pixel receives light for the "Δ" portion of the image; the third pixel receives light for the "□" portion of the image; similarly, the (n−1)$^{th}$ pixel receives light for the "⊙" part of the image, and the n$^{th}$ pixel receives light for the "∇" part of the image.

Next, with respect to a pixel line aligned in the direction of movement of the image position, summed levels for each pixel are calculated by sequentially summing the differences in output levels of each pixel relative (S207).

Thus the second pixel receives light for the "○" portion of the image before image movement, and receives light for the "Δ" portion of the image after image movement. The difference Δ2 in output level before and after moving the second pixel corresponds to the luminance difference between the "○" and "Δ" parts of the image. The third pixel receives light for the "Δ" portion of the image before image movement, and receives light for the "□" portion of the image after image movement. The difference Δ3 in output level before and after moving the second pixel corresponds to the luminance difference between the "○" and "□" parts of the image. The n$^{th}$ pixel receives light for the "⊙" portion of the image before image movement, and receives light for the "∇" portion of the image after image movement. The difference Δn in output level before and after moving the second pixel corresponds to the luminance difference between the "⊙" and "∇" parts of the image. Thus the difference in luminance between parts of an image corresponding to two pixel positions adjacent on a pixel line L can be detected using the same pixel.

Here, the subtraction of the output level of a pixel prior to movement from the output level of a pixel after image movement is taken as the difference. In such cases, differences are sequentially summed for pixel lines arrayed along the direction of movement of the image position, facing in the direction of movement on the light-receiving surface relative to the image position (the right direction in FIG. 4(a)), i.e., facing in the direction of movement (the left direction in FIG. 4(a)) of the image position relative to the light-receiving surface (from left to right in FIG. 4(a)). The shift amounts of individual pixels in the pixel line are calculated as a total of the difference from the edge of the pixel line up to the relevant pixel.

Note that when adopting the subtraction of the output level of the same pixel after image movement from the output level of a pixel prior to image movement as the difference, it is desirable to sum from the opposite direction as above.

In the example shown in FIG. 4(c), when a difference is obtained by subtracting the output level prior to moving an image from the output level after moving an image, the summing level for each pixel is calculated using "0" as the summing level for the first pixel. For example, the second pixel summed level is calculated as Δ2=(0+Δ2). The third pixel summed level is calculated as (Δ2+Δ3). The fourth pixel summed level is calculated as (Δ2+Δ3+Δ4). Similarly, the (n−1)$^{th}$ pixel summed level is calculated as (Δ2+Δ3+Δ4+ ... (n−1)).

Figure 5:
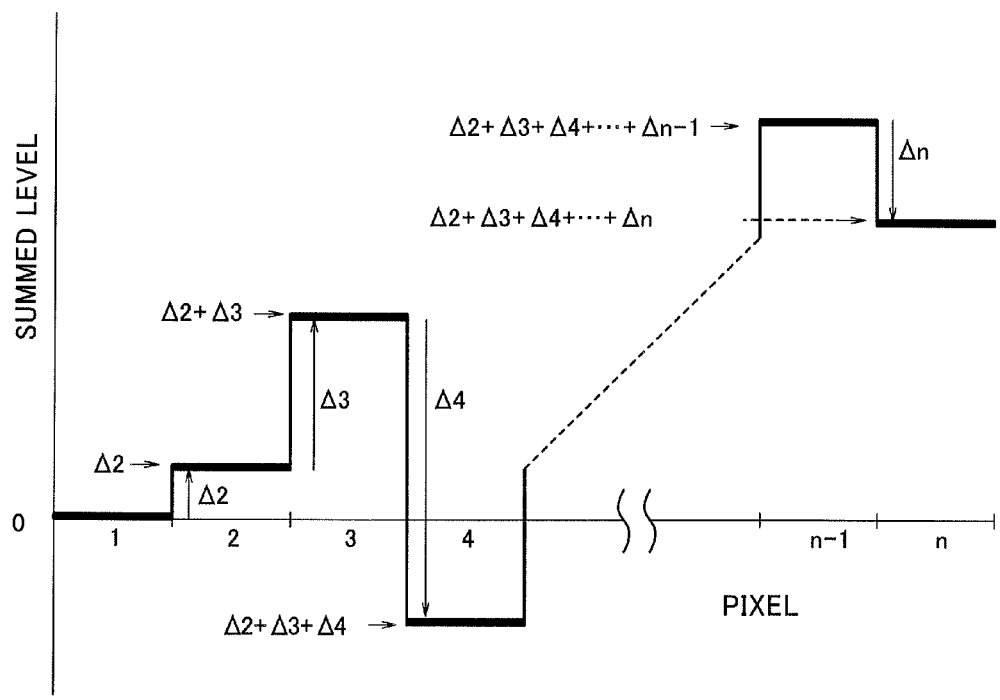
FIG. 5: A diagram showing summed levels of pixels on a pixel line.

Each difference may be positive or negative. Therefore the summed level of each pixel in the pixel line L rises and falls in each pixel, as shown in FIG. 5.

Next, the image generating section 133 of the image processing means 13 generates images based on the summed level of each pixel rather than on the output levels of each pixel (S208). The summed level for each pixel corresponds in substance to the output level of each pixel. Therefore an image with a precise luminance gradient is generated regardless of inter-pixel output level variability by generating an image based on the summed level of each pixel rather than the actual output level of each pixel.

Second Operating Example

Figure 6:
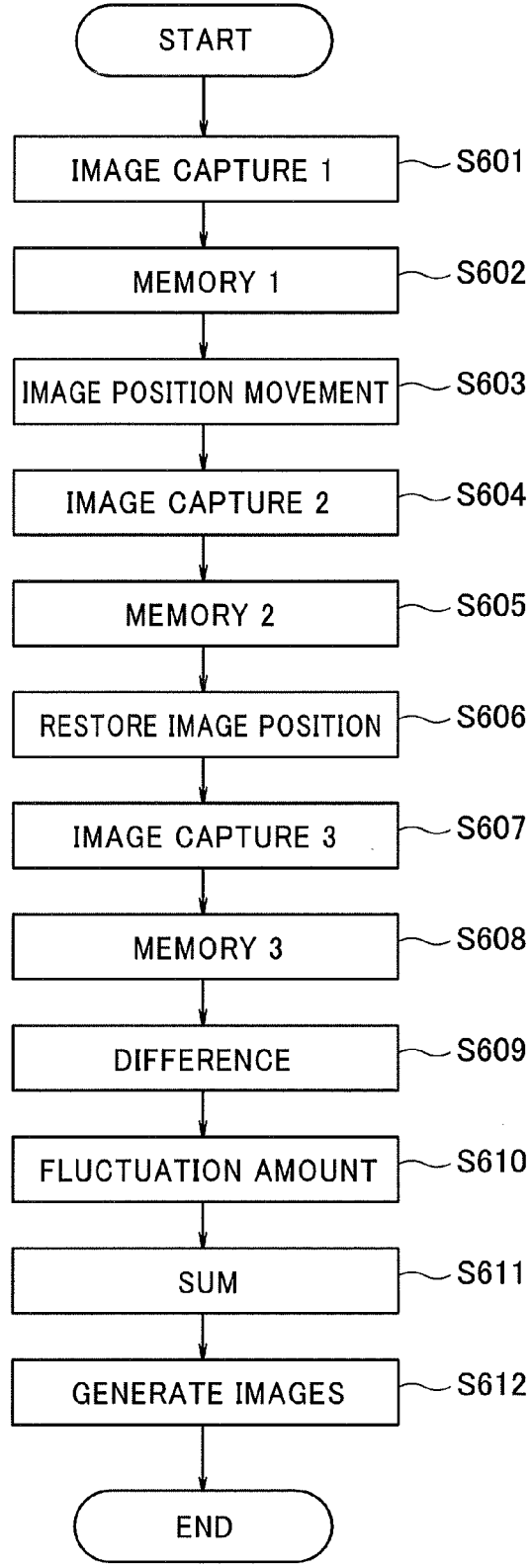
FIG. 6: A flow chart explaining a second operating example of an image capturing device according to an embodiment of the present invention.

Next, referring to the FIG. 6 flow chart, we discuss a second operating example of the image capturing device according to an embodiment. The second operating example is the same as the above-described first operating example up until the step in which the image on the light-receiving surface is captured (S604) after movement of the image position, and the output levels of each pixel are stored in the second memory (S605).

Figure 7:
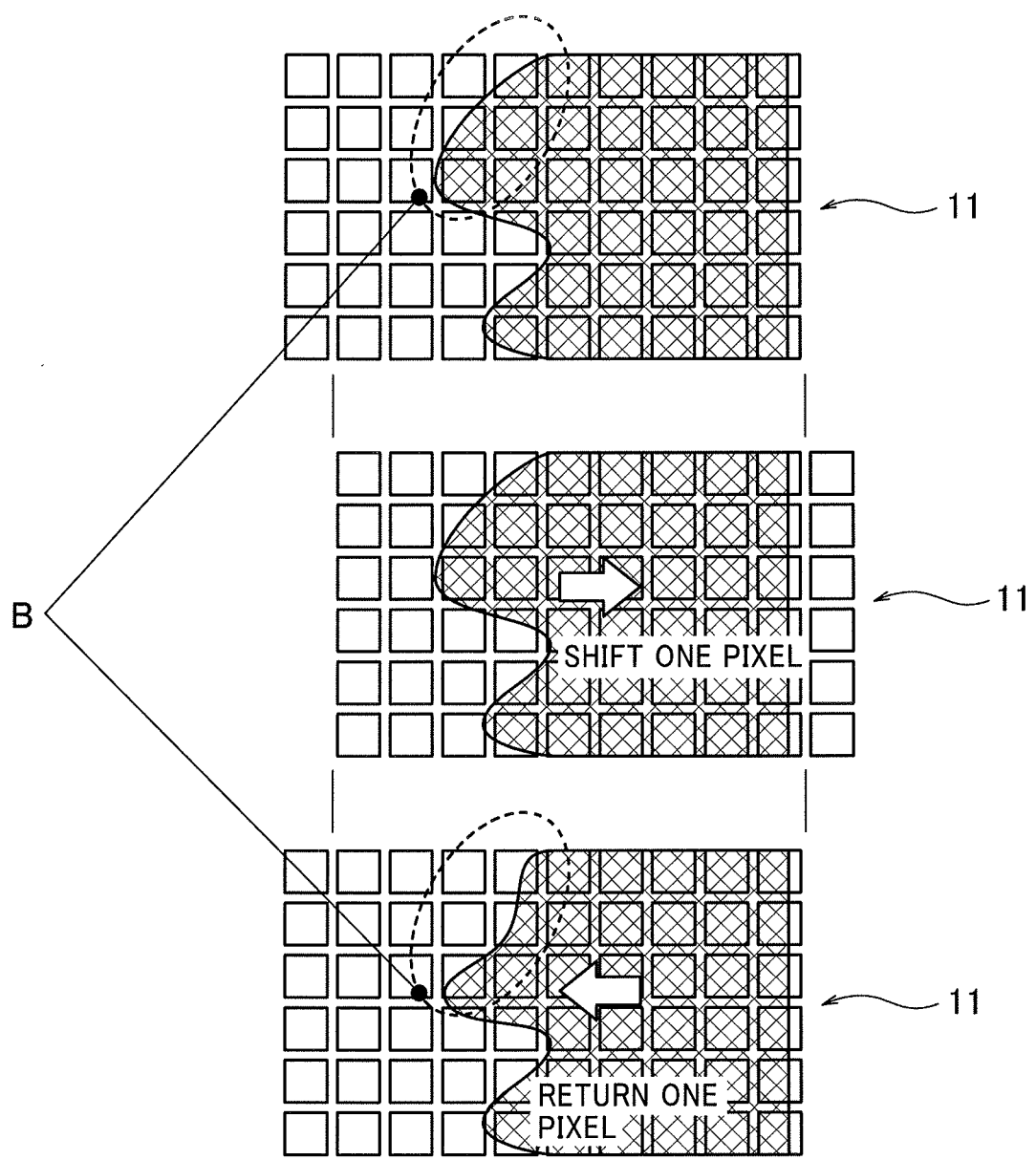
FIG. 7: A diagram showing the positional relationship between screen and image, before and after moving the image position and after returning the image position.

In the second working example, after moving the image position, the image shifting means 22 returns the image position to the pre-image movement position (S606). Here we show the image on the light-receiving surface 11 prior to moving the image; the middle of FIG. 7 shows the image on the light-receiving surface 11 after moving the image, and the bottom of FIG. 7 shows the image after being returned to the image position. The diagrams shown in the middle and lower portion of FIG. 7 correspond to the diagrams shown in the top and bottom parts of FIG. 3(a).

Next, the image capturing means 12 again captures the image on the light-receiving surface 11 (S607) after the image position is restored, and stores the output levels for each pixel of the captured image in a third memory (S608). A third image memory is provided in the camera body 10.

Next, as in the above-described first operating example step (S206), the image processing section 13 difference calculating section 131 reads out the output levels of pixels prior to image movement stored in a first pixel memory and the output levels of pixels after image movement stored in a second pixel memory, and calculates the difference in output levels between pixels respectively receiving light from the same parts of an image on the light receiving before and after image movement (S609).

Next, the image processing section 13 reads out the output levels of pixels prior to image movement stored in a first pixel memory and the output levels of pixels after returning the image position stored in a third pixel memory, and computes the amount of change in output levels between the same pixels before moving the image position and after restoring the image position (S910).

Comparing the images on the light-receiving surface 11 in the top and bottom portions of FIG. 7, the image in the part surrounded by the dotted line B is changing. Such changes in image occur due to movement of an imaged object, for example. The difference in pixel output levels in such parts does not accurately reflect the differences in output levels stemming from variations in the output characteristics of the pixels themselves. The pixels in the portion surrounded by dotted line B show values at which the amount of variability is high.

Therefore in the second working example, the summed level calculating section 132 sums up to calculate a summed level, excluding the pixel difference with an amount of variation equal to or greater than a predetermined reference value (S661). For example, if the amount of variability in pixels midway on a pixel line is equal to or greater than a reference value, it is desirable to obtain an offset by adding only the differences up to the pixel before the pixel for which the amount of change is equal to or greater than the reference value. Summed levels can thus be prevented from becoming inaccurate.

Note that the reference value can be set to a desired favorable value according to the environment in which the image capturing device 1 is used.

Continuing, as in the first working example, images are generated based on the summed level of the pixels rather than the output levels of the pixels (S612).

Third Operating Example

Figure 8:
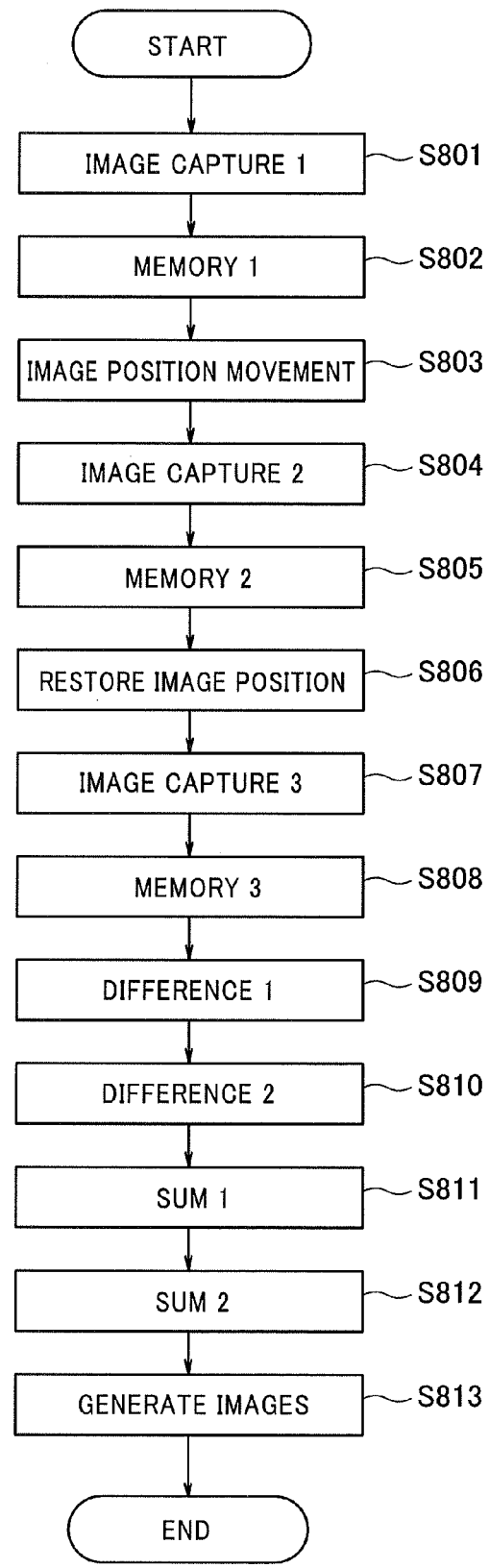
FIG. 8: A flow chart explaining a third operating example of an image capturing device according to an embodiment of the present invention.

Next, referring to the FIG. 8 flow chart, we discuss a third operating example of the image capturing device according to an embodiment. The third operating example is substantially the same as the above-described first operating example up until the step in which the image on the light-receiving surface is captured (S804) after movement of the image position, and the output levels of each pixel are stored in the second memory (S805).

Figure 9:
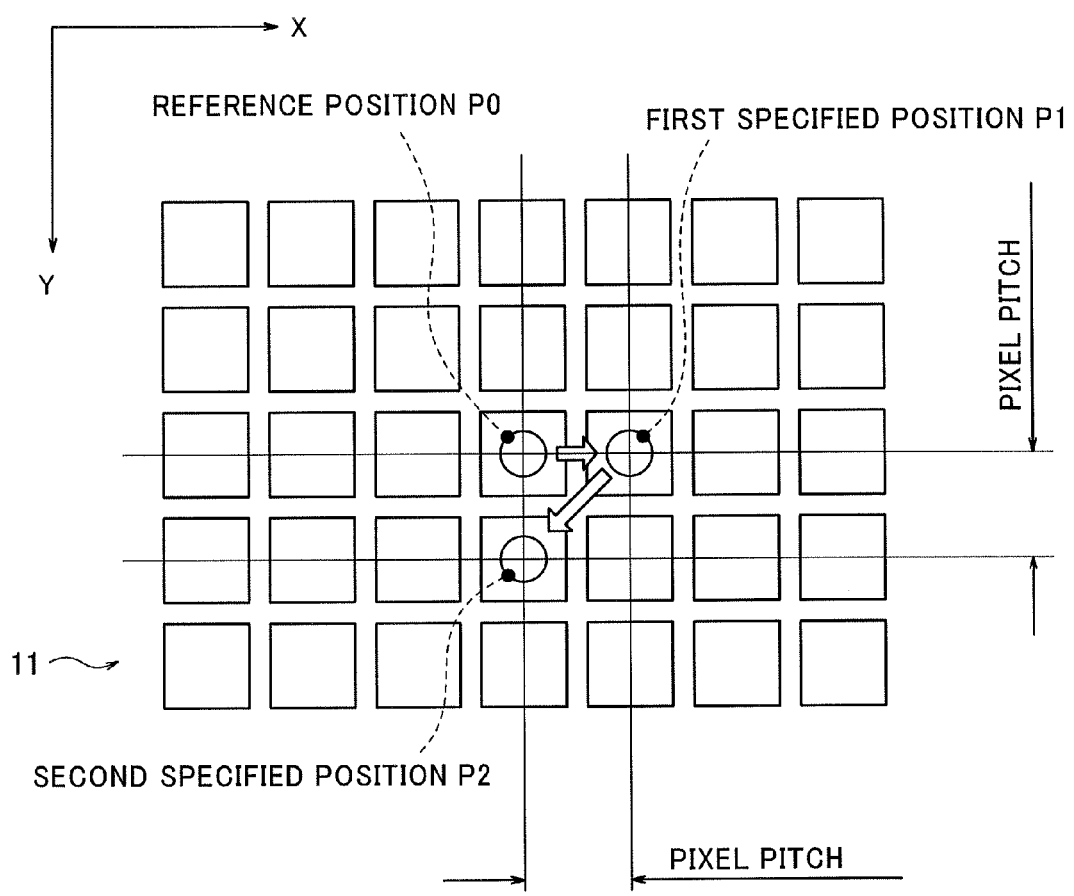
FIG. 9: A diagram showing the relationship between the alignment of pixels on a light-receiving surface and the direction of movement of the image position.

Here, referring to FIG. 9, we discuss the relationship between the arraying of pixels on the light-receiving surface 11 and the direction of movement of the image position. In the light-receiving surface 11 shown in FIG. 9, the pixels are arrayed in a 2D matrix comprising mutually perpendicular X and Y directions. Prior to movement of the image position, the "○" portion of the image is positioned on pixel P0 at a reference position. At this point, the image prior to movement on the light-receiving surface 11 is captured (S801) and the output levels of each pixel constituting the light-receiving surface 11 are stored in the first memory (S802).

Next, a first image movement is implemented (S803) in order to move the "○" portion of the image in the X direction by one pixel pitch, from reference position pixel P0 to a first specified position pixel P1. As a result, the "○" in the image is positioned on first specified position P1.

Next, after the first movement, the post-movement image on the light-receiving surface 11 is captured (S804), and the output levels of each pixel constituting the light-receiving surface 11 are stored in the second memory (S805).

Next, a second image movement is conducted (S806) so that the "○" portion of the image is moved diagonally to the left and downward from a pixel P1 at a first specified position by the square root of one pixel (multiply by √12). As a result, the "○" in the image is positioned at a second specified position P2. As a result of the first and second movements, the "○" portion of the image is moved in the Y direction by one pixel pitch, from reference position pixel P0 to a second specified position pixel P2.

Next, after the second movement, the post-movement image on the light-receiving surface 11 is captured (S807), and the output levels of each pixel constituting the light-receiving surface 11 are stored in the third memory (S808).

Next, the output levels stored in the first and second memories are read out, and a first difference between output levels for the same pixels at the time of image capture before and after movement of the image position in the X direction (before and after the first movement) are calculated (S809). Note that first differences are calculated for each of the pixel lines arrayed in the X direction on the light-receiving surface 11.

Next, the output levels stored in the first and third memories are read out, and a second difference between output levels for the same pixels at the time of image capture before and after movement of the image position in the Y direction (before and after the first and second movements) are calculated (S810). Note that a second difference is calculated for each of the pixel lines arrayed in the Y direction on the light-receiving surface 11.

Next, with respect to pixel lines arrayed in the X direction, output level first differences are sequentially summed and a first summed level for each pixel in pixel lines arrayed in the X direction is calculated (S811). Note that first summed levels are calculated for each of the pixel lines aligned in the X direction on the light-receiving surface 11.

Here, assuming the corner pixel to the upper left on the light-receiving surface 11 in FIG. 9 has the reference position (1, 1), the first summed level Bi (m, n) of the pixel (m, n) at the $m^{th}$ position in the X direction and the $n^{th}$ position in the Y direction from this reference position (0, 0) is expressed by Equation (1) below, assuming the first difference for that pixel is $\Delta x$ (m, n).

$$Bi(m,n)=Bi(m-1,n)+\Delta x(m,n) \quad (1)$$

Of the pixel lines arrayed in the X direction, the line at the edge does not have a summed value up until then, so the summed level of each pixel (0, n) in this line at the edge is calculated as 0, as shown in Equation (2) below.

$$Bi(m,0)=Bi(m-1,0)+\Delta x(m,0)=0 \quad (2)$$

Next, with respect to the pixel rows arrayed in the Y direction, output level second differences are sequentially summed to calculate a second summed level for each pixel in pixel lines arrayed in the Y direction (S812). Note that second summed levels are calculated for each of the pixel lines aligned in the Y direction on the light-receiving surface 11.

Here, the second summed level Bi (m, n) of the pixel (m, n) at the $m^{th}$ position in the X direction and the $n^{th}$ position in the Y direction from this reference position (0, 0) is expressed by Equation (3) below, assuming the second difference for that pixel is $\Delta y$ (m, n).

$$Bi(m,n)=Bi(m,n-1)+\Delta y(m,n) \quad (3)$$

Of the pixel lines arrayed in the X direction, the line at the edge does not have a summed value up until then, so the summed level of each pixel (0, n) in this line at the edge is calculated as 0, as shown in Equation (4) below.

$$Bi(0,n)=Bi(0,n-1)+\Delta y(0,n-1)=0 \quad (4)$$

Next, an image is generated (S813) based on the first and second summed levels for each of the pixels. Here, as shown in Equation (5) below, the average of the first and second summed levels for each of the pixels presents the summed levels for each of the pixels.

$$Bi(m,n)=\{Bi(m-1,n)+\Delta x(m,n)+Bi(m,n-1)+\Delta y(m,n)\}/2 \quad (5)$$

By thus generating images based on the average of the X direction summed level and Y direction summed level, the images can be generated with continuous luminance in both the X and Y directions.

Note that an error is included in the value of each difference. For this reason, the difference errors are accumulated in the summed level obtained by summing differences. We therefore explain below a first and second method for correcting the summed level serving as luminance value.

We first explain the first correction method. In the first correction method, a luminance value is determined for three pixels on the light-receiving surface 11. First, the luminance at the three coordinate points is defined as follows.

Coordinate (Xa, Ya), luminance Ba
Coordinate (Xb, Yb), luminance Bb
Coordinate (Xc, Yc), luminance Bc Note that an offset correction may be performed so that the average luminance value of the three points is a fixed value.

An equation is thus obtained for a plane defined by the following three expressions:

$$Ba = kx*Xa + ky*Ya + C$$

$$Bb = kx*Xb + ky*Yb + C$$

$$Bc = kx*Xc + ky*Yc + C \qquad (5)$$

Solving for kx, ky, and c in the three expressions above, $$kx = \{Ba(Yb-Yc)+Bb(Yc-Ya)+Bc(Ya-Yb)\}/\{Xa(Yb-Yc)+Xb(Yc-Ya)+Xc(Ya-Yb)\}$$

$$ky = \{Ba(Xb-Xc)+Bb(Xc-Xa)+Bc(Xa-Xb)\}/\{Xa(Yb-Yc)+Xb(Yc-Ya)+Xc(Ya-Yb)\}$$

$$C = \{Ba(XbYc-XcYb)+Bb(XcYa-XaYc)+Bc(XaYb-XbYa)\}/\{Xa(Yb-Yc)+Xb(Yb-Ya)+Xc(Ya-Yb)\}$$

Assuming a post-correction luminance value (summed value) of Br(m, n) for a pixel at coordinate (m, n), the following calculation can be made:

$$Br(m,n) = B(m,n) + kx*m + ky*n + C$$

Note that it is also acceptable to compare luminance values in a partial region or over the entire surface of the light-receiving surface 11 to correct luminance.

We next explain the second correction method. In the second calculating method, the summed level of each pixel is corrected so that the average value of the output level of each pixel and the average value of the summed level of each pixel are equal for the entire area of the light-receiving surface and the same region.

First, an average value is calculated for the output levels of pixels in the entirety or a partial region of the light-receiving surface 11. If, in that region, pixels are two-dimensionally arrayed by M pixels in the X direction and N pixels in the Y direction, then assuming an output level of B(m, n) for a pixel at the $m^{th}$ position in the X direction and $n^{th}$ position in the Y direction in that region, the average value S for the pixel output level in that region is calculated as shown below by dividing the total of the output levels for all pixels in that region by the total number of pixels (M×N) in that region.

Note that M, N, m, and n are integers, and $1 \leq m \leq M, 1 \leq n \leq N$.

$$S = \sum_{m=1}^{M} \left\{ \sum_{n=1}^{N} B(m,n) \right\} \div (M \times N)$$

At the same time, the summed level Bi(m, n) for each pixel in the same region is expressed as shown in Eq. (5) above.

$$Bi(m,n) = \{Bi(m-1,n) + \Delta x(m,n) + Bi(m,n-1) + \Delta y(m,n)\}/2 \qquad (5)$$

Note that when m=1, the Eq. (5) above is expressed as shown in Eq. (6) below.

$$Bi(1,n) = \{Bi(1,n-1) + \Delta y(1,n)\}/1 \qquad (6)$$

Also, when n=1, Eq. (5) above is expressed as shown in Eq. (7) below.

$$Bi(m,1) = \{Bi(m-1,1) + \Delta x(m,1)\}/1 \qquad (7)$$

Moreover, when m=n=1, Eq. (5) above is expressed as shown in Eq. (8) below.

$$Bi(1,1) = Bi(1,1) \qquad (8)$$

The average value Si of the summed levels of each pixel in that same region is calculated as shown below by dividing the total of the summed level of all pixels in that same area by the total number of pixels (M×N) in that same area.

$$Si = \sum_{m=1}^{M} \left\{ \sum_{n=1}^{N} Bi(m,n) \right\} \div (M \times N)$$

The summed level of each pixel is corrected so that the average value S of the actual output levels of each pixel in the same region is equal to the average value of the post-correction summed value. Specifically, the difference between the output level average value S and the summed level average value Si (ΔS=S−Si) is added to the summed level of each pixel as shown below.

$$Br(m,n) = Bi(m,n) + \Delta S$$

An image with reduced luminance errors can be produced by thus correcting the summed level of each pixel.

Note that because no level correction of this type is shown in the first operating example, the level of the "∘" portion for the summing result ends up being a "0." Assuming N=1, by performing a level correction on each pixel line, the level of the post-correction "∘" portion is corrected to a level corresponding to "∘".

Figure 10:
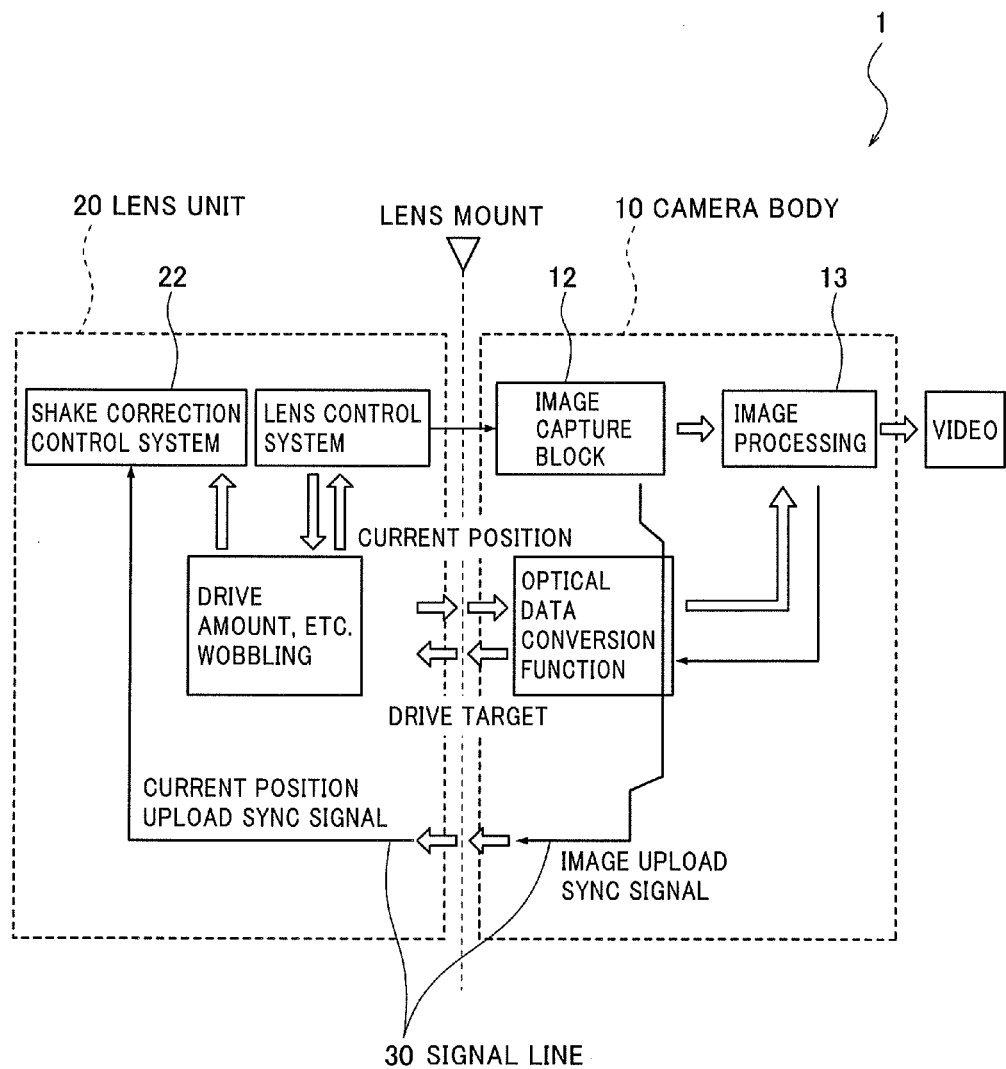
FIG. 10: A diagram explaining data transfer between the camera body 10 and the lens unit 20.
Figure 11:
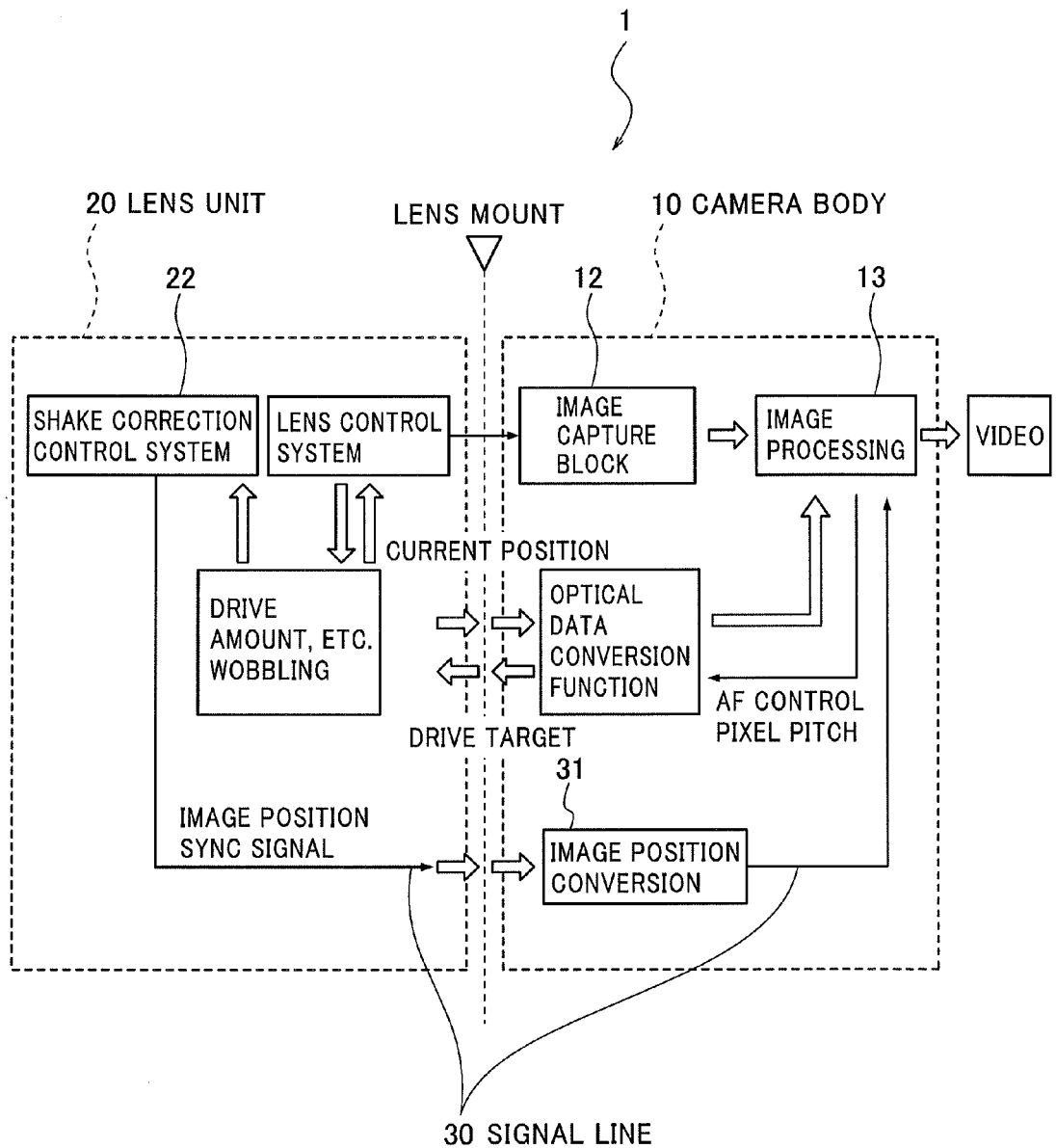
FIG. 11: A diagram explaining data transfer between the camera body 10 and the lens unit 20.

Next, referring to FIGS. 10 and 11, we discuss the transfer of data between camera body 10 and lens unit 20.

In FIGS. 10 and 11, the image capture block of the camera body 10 corresponds to the image capturing means 12 in FIG. 1, and the image processing block corresponds to the image processing means 13 in FIG. 1. Also, in FIGS. 10 and 11, the blur-correction control system block in the lens unit 20 corresponds to the image shifting means 22 in FIG. 1. Note that the lens unit 20 lens control system block represents the function of controlling focusing, zooming, and the like of the lens system.

In the image capturing device 1 of the embodiment, a blur correction control mechanism may be utilized as the image shifting means 22. However, whereas in a normal blur correction control mechanism is performed to cancel out movement of the image capturing device 1, the image shifting means 22 is controlled so that the image position moves by a predetermined amount in a predetermined direction relative to the light-receiving surface.

If the lens unit 20 is an interchangeable lens attachable to multiple types of camera main bodies, pixel pitch and the like may differ from one camera body to another. It is therefore sometimes necessary for the camera body 10 to instruct the lens unit 20 with an amount by which the image shifting means 22 is to move the image position. Furthermore, because images on the light-receiving surface are respectively captured before and after movement of the image position by the image shifting means 22, it is necessary to control image capture timing and the timing at which the image position is moved.

Therefore in the image capturing device 1 shown in FIGS. 10 and 11, data including inter-pixel spacing is output from the image processing section 13 in the camera body 10 to the lens unit 20 as an optical data conversion function. The lens unit 20 determines the amount driven by image shifting means 22 based on the optical data conversion function input from the camera body 10, and moves the image position.

If, for example, the pixel pitch on the light-receiving surface of the image capture block 12 in the camera body 10 is 20 μm, data instructing a pixel pitch of 20 μm is sent from the camera body 10 to the lens unit 20. When the proportion of the amount of movement of the image position relative to the amount of driving of the blur-correction control system (correction optics) of the lens unit 20, i.e. the correction optics effective rate, is 0.8, the amount by which the blur correction system is driven for a single pixel pitch is calculated as 20÷0.8=25 (μm). The image position on the light-receiving surface moves a 20 μm single pixel pitch as the result of the 25 μm driving of the blur correction control system. It is thus possible to perform movements of one pixel pitch, matching the pitch of the pixels in the light-receiving surface in the image block 12 of the camera body 10.

In the image capturing device 1 shown in FIG. 10, the camera body 10 image capture block 12 and the lens unit 20 blur correction control system 22 are connected by the signal line 30. The image capture block 12 outputs a sync signal for syncing the timing at which an image on the light-receiving surface is captured. I.e., the signal line 30 is enabled (made valid) at the time of image capture. This sync signal is transferred to the blur correction control system 22 through a signal line 30. The blur correction control system 22 moves the image position based on the sync signal. Timing of the image position movement can thus be matched to that of image capture.

In the image capturing device 1 shown in FIG. 11, the lens unit 20 blur correction control system 22 and the camera body 10 image processing section 13 are connected by a signal line 30 through an image position conversion block 31. The blur correction control system 22 outputs a sync signal synced to the timing at which the image position is moved. I.e., the signal line 30 is enabled at the timing at which the blur correction control system 22 is driven. This sync signal is transferred to the image processing block 13 via the image position conversion block 31 over signal line 30. For example, the blur correction control system 22 outputs a sync signal at the same time as the blur correction control system 22 drives a predetermined drive amount to move the image position to a predetermined position.

The drive amount and drive direction are also output by the blur correction control system 22 together with this sync signal, and the amount of drive is converted by the image position conversion block 31 to a pixel pitch count corresponding to the amount of image position movement. The image capture block 12 captures images on the light-receiving surface based on the sync signal. Continuing, it is desirable for the image processing block 13 to calculate the difference between output levels for the same pixels before and after image movement. Thus in an interchangeable lens system, generation of an image with precise luminance gradation can be achieved regardless of variability in inter-pixel output levels by matching the timing of image position movement and image capture.

Fourth Operating Example

Figure 12:
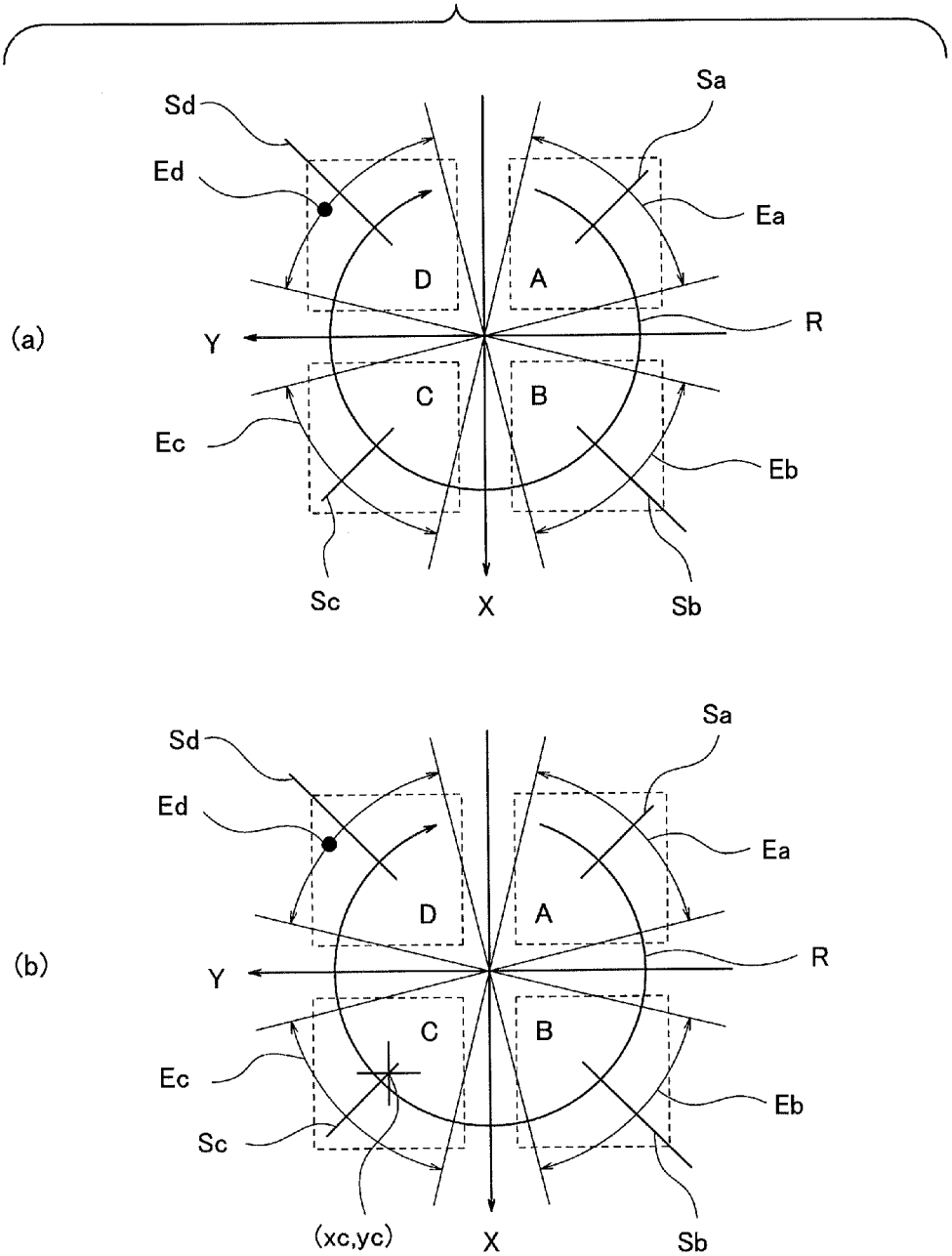
FIG. 12: (a) and (b) are diagrams showing the track when an image is caused to move at a uniform velocity on a light-receiving surface in a fourth operating example of an image capturing device in an embodiment of the present invention.

Next, referring to FIG. 12, we discuss a third operating example of the image capturing device according to an embodiment. FIGS. 12(a) and (b) are expanded diagrams of the four pixels A through D, adjacent and two-dimensionally arrayed, among the pixels constituting the light-receiving surface 11.

In the fourth working example, as shown in FIG. 12(a), an image position is translationally moved on the light-receiving surface 11 so that a given point (also referred to as the "image point" below) describes a circular orbit R on the light-receiving surface 11. As shown in FIG. 12(a), the image position moves so that the image point on the light-receiving surface 11 makes a continuous constant velocity circular movement. The radius of this circular orbit R may, for example, be $(1/(\sqrt{2}))\times$ the pixel pitch.

Note that FIG. 12(a) shows only the four pixels A through D, but in the entirety of the light-receiving surface 11 the image position is translationally moved so that the trajectories of each point of the entire image on the light-receiving surface 11 simultaneously describe circular orbits.

Here, referring to the timing chart in FIG. 13(a), we discuss image capture timing. Line I in FIG. 13(a) depicts the timing of a sync signal, and line II depicts pixel light exposure time. Exposure periods Ea, Eb, Ec and Ed are respectively the periods in which an image point moving at uniform speed on the circular orbit R are positioned on pixels A, B, C, and D. These exposure periods Ea, Eb, Ec, and Ed also correspond to the period in which the image point in FIG. 12(a) is positioned in section Ea on pixel A, section Eb on pixel B, section Ec on pixel C, and section Ed on pixel D within the circular orbit R.

Sync signals A, B, C, and D are output from the image shifting means 22 at the centers of the FIG. 13(a) exposure periods Ea, Eb, Ec, and Ed. As a result, images are captured on the light-receiving surface when the image point is positioned at the center positions Sa, Sb, Sc, and Sd of the FIG. 12(a) sections Ea, Eb, Ec, and Ed.

Note that a delay time occurs from the time the sync signals A, B, C, and D are output until actual image capture takes place. Considering this delay time, it is also acceptable to delay the output timing of sync signals A, B, C, and D by a predetermined time from the middle of the respective exposure periods relative to the exposure periods Ea, Eb, Ec, and Ed indicated by line IV, as shown by line III in FIG. 13(b).

Figure 14:
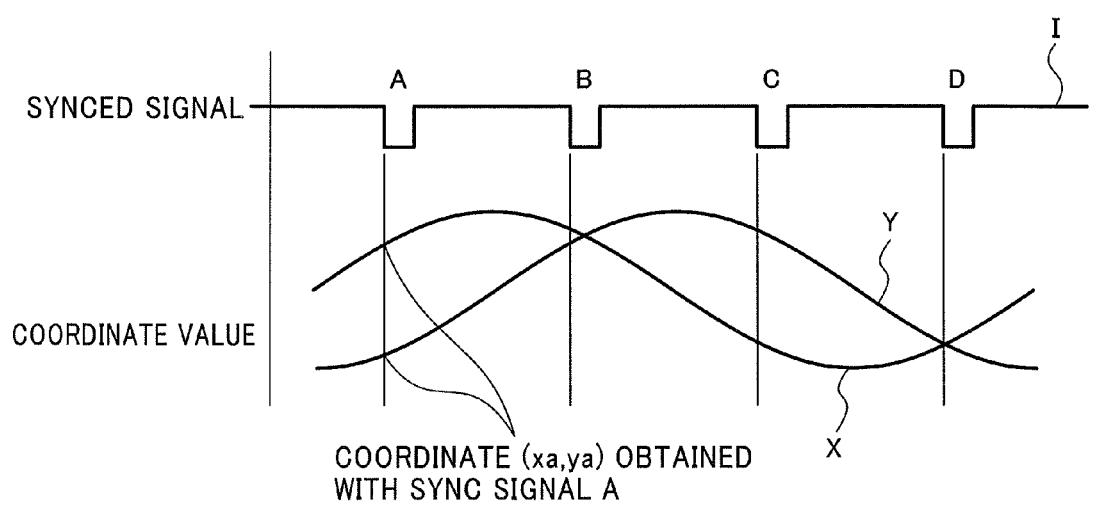
FIG. 14: A timing chart showing the relationship between the sync signal and the image position.

It is desirable for the image processing block 13 to output the position of the image point to the camera body 10 together with the sync signal. It is desirable for the position of the image point to be expressed by XY coordinates using the center of the four pixels A through D as origin, as shown in FIG. 12(a). Here we show the relationship between the sync signal in the FIG. 14 timing chart and the image point coordinates. Line I in FIG. 14 shows the timing of the sync signal; curves X and Y respectively show the image point X and Y coordinates. Coordinates (xa, ya) of the image point on the pixel A at that time are obtained at the output timing of the sync signal A shown by line I. These coordinates are output to the camera body 10.

Note that when the image position moves for the purpose of blur correction, it is desirable to output a value for the image point coordinate from which the amount of image movement by blur correction is subtracted.

Image point positions may be represented as the coordinates of the respective average values of the sections Ea, Eb, Ec, and Ed on the circular orbit R on each pixel. For example, the coordinates (xc, yc) with the average value of section Ec on the pixel C in FIG. 12(b) are obtained by Equation (1) below.

$$\int (\text{coordinate}) \times (\text{existence time}) dt \div (\text{section } Ed \text{ existence time}) \qquad (1)$$

The fourth operating example in which the image on the light-receiving surface is captured at the image capture timing described above basically corresponds to the FIG. 8 flow chart in the fourth operating example, as described below.

First, the image capturing means 12 captures respective images on the light-receiving surface 11 before and after the image point moves over a predetermined part of the circular orbit R. Specifically, for capture of images prior to movement, an image on the light-receiving surface 11 is first captured (FIG. 8, S801) when the image point is positioned at the Sa point of the pixel A on the circular orbit R. The captured image is stored in the first memory (S802).

Next, the image point moves on the circular orbit R from point Sa on pixel A to point Sb on pixel B (S803). The image point makes a constant velocity circular movement on the circular orbit R, but the direction going from point Sa to point Sb is along the X direction. Therefore this movement direction is deemed the X direction.

Next, the image on the light-receiving surface 11 is captured (S804) when the image point is positioned on point Sb on pixel B on the circular orbit R. The captured image is stored in the second memory (S805).

Continuing, the image point moves through circular orbit R from point Sb on pixel B to point Sc on pixel C (S806). The image point make a constant velocity circular movement on the circular orbit R, but the direction going from point Sb to point Sc is along the Y direction. Therefore this movement direction is deemed the Y direction.

Next, the image on the light-receiving surface 11 is captured (S807) when the image point is positioned on point Sc on pixel C on the circular orbit R. The captured image is stored in the third memory (S808).

Next we calculate the difference between the output levels of the same pixels before and after the image point is moved in the X direction over a predetermined part of a circular orbit. The output levels stored in the first and second memories are then read out, and a first difference between output levels for the same pixels at the time of image capture before and after movement of the image position in the X direction are calculated (S809).

In addition, we calculate the difference between the output levels of the same pixels before and after the image point is moved in the Y direction over a predetermined part of a circular orbit. The output levels stored in the first and third memories are then read out, and a second difference between output levels for the same pixels at the time of image capture before and after movement of the image position in the Y direction is calculated (S810).

Next, with respect to pixel lines arrayed in the X direction, output level first differences are sequentially summed and a first summed level for each pixel in pixel lines arrayed in the X direction is calculated (S811). Also, with respect to the pixel rows arrayed in the Y direction, output level second differences are sequentially summed to calculate a second summed level for each pixel in pixel lines arrayed in the Y direction (S812).

Next, an image is generated (S813) based on the first and second summed levels for each of the pixels.

Thus in the fourth operating example, an image position can be continuously moved by moving the image position so as to cause its track to describe a circular orbit. Positioning accuracy for the image position can thus be easily obtained. Also, an image position can be moved in a stable manner by moving the image position to achieve continuous uniform velocity straight line motion. Corrections can also be easily implemented in each cycle of the circular movement of the image position.

In the image memory described above we discussed examples in which the present invention is constituted for particular conditions, but the invention is not limited thereto, and various modifications and combinations of the present invention are possible. In the above-described embodiments we discussed an example of an image capturing device in which an image shifting means was incorporated into the optics, but in the present invention the image shifting means is not limited thereto. The image shifting means may also displace the entire optics in a direction perpendicular to the optical axis thereof, and displace the light-receiving surface of the image capturing means in a direction perpendicular to the optical axis of the optics.

POTENTIAL INDUSTRIAL APPLICATIONS

The present invention may also be applied to an image capturing device for capturing infrared images, or to an image capturing device for visible light images. The present invention is also favorably used in monitor cameras for which there is a requirement for uninterrupted image capture. The present invention may also be applied to line sensors having a light-receiving surface constituted by a single pixel line.

The present invention may also be favorably applied to image capturing devices with the object of detecting low-luminance imaged objects, minute changes in imaged object luminance, and so forth. Use of the present invention is also favorable for image measurement in fields such as image sensing, exterior appearance inspection, and medicine. Use of the present invention is also favorable for capturing images of low luminance imaged objects in celestial body observation, night vision, and surveillance.

EXPLANATION OF REFERENCE NUMERALS

1: image capturing device
10: camera body
11: light-receiving surface
12: image capturing means
13: image processing means
20: lens unit
21: optics
22: image shifting means
22a: lens
131: difference calculating section
132: summed level calculating section
133: image generating section

The invention claimed is:

1. An image capture device comprising:
   image capturing means having a light-receiving surface, on which pixels are arrayed, each pixel being composed of an image capturing element outputting an electrical signal at an output level responsive to received light intensity;
   optics for forming an image of an object in a position on the light-receiving surface;
   image shifting means for moving an image position on the light-receiving surface; and
   image processing means for processing images captured by the image capturing means, wherein
   the image capturing means captures respective images on the light-receiving surface before and after movement of the image position by the image shifting means;
   the pixels on the light-receiving surface are arrayed in a two dimensional matrix in a first alignment direction and in a second alignment direction perpendicular to the first alignment direction;
   the image shifting means causes the image position to move in the first alignment direction of the pixels on the light-receiving surface and in the second alignment direction perpendicular to the first alignment direction; and
   the image processing means has
      an output level difference calculating section configured to calculate a first output level difference between output levels of each pixel in the first alignment direction when respective images on the light-receiving surface are captured by the image capturing means before and after movement of the image position in the first alignment direction, and a second output level difference between the output levels of each pixel in the second alignment direction when respective images on the light-receiving surface are captured by the image capturing means before and after movement of the image position in the second alignment direction;

a summed output level difference calculating section configured to sequentially sum first output level differences in output levels from respective pixels in the first alignment direction to calculate a first summed output level difference of each pixel with respect to a first pixel line arrayed in the first alignment direction, and second output level differences in output levels from respective pixels in the second alignment direction to calculate a second summed output level difference of each pixel with respect to a second pixel line arrayed in the second alignment direction; and an image generating section for generating an image based on the first and second summed output level differences of each pixel rather than the output level of each pixel responsive to received light intensity.

2. The image capture device of claim 1, wherein the image capturing means and the image processing means comprise an image capture device main unit;

the optics and the image shifting means comprise a lens unit detachable from the image capture device main unit;

the image capture device main unit outputs data including pixel spacing on the light-receiving surface to the lens unit; and the image shifting means moves the image position based on the data.

3. The image capture device of claim 1, wherein the image capturing means outputs a sync signal in sync with a timing at which the image on the light-receiving surface is captured; and the image shifting means moves the image position based on the sync signal.

4. The image capture device of claim 1, wherein the image shifting means outputs a sync signal in sync with a timing at which the image position is moved; and the image capturing means captures the image on the light-receiving surface based on the sync signal.

5. The image capture device of claim 1, wherein the image capturing element is a bolometer or a microbolometer.

6. An image capture device comprising:

an image capturing means having a light-receiving surface, on which pixels are arrayed, each pixel being composed of an image capturing element outputting an electrical signal at an output level responsive to received light intensity;

optics for forming an image of an object in a position on the light-receiving surface;

an image shifting means for moving an image position on the light-receiving surface; and an image processing means for processing images captured by the image capturing means, wherein the image capturing means captures respective images on the light-receiving surface before and after movement of the image position by the image shifting means;

the pixels on the light-receiving surface are arrayed in a two dimensional matrix in a first alignment direction and in a second alignment direction perpendicular to the first alignment direction;

the image shifting means moves the image position translationally so that a track of any given point in the image on the light-receiving surface describes a circular orbit on the light-receiving surface;

the image capturing means captures images on the light-receiving surface before and after movement of the image position by the image shifting means so that the given point in the image on the light-receiving surface moves over each of first and second predetermined parts of the circular orbit; and the image processing means has an output level difference calculating section configured to calculate an output level difference between output levels of each pixel when respective images on the light-receiving surface are captured by the image capturing means before and after movement of the image position by the image shifting means so that the given point in the image on the light-receiving surface moves over each of the first and second predetermined parts of the circular orbit;

a summed output level difference calculating section configured to sequentially sum first output level differences in output levels from respective pixels in a first pixel line along a straight line direction connecting respective positions of the given point in respective images when the respective images are captured, before and after movement of the image position so that the given point moves over the first predetermined part of the circular orbit to calculate a first summed output level difference of each pixel with respect to the first pixel line, and sequentially sum second output level differences in output levels from respective pixels in a second pixel line along a straight line direction connecting respective positions of the given point in respective images when the respective images are captured, before and after movement of the image position so that the given point moves over the second predetermined part of the circular orbit to calculate a second summed output level difference of each pixel with respect to the second pixel line; and an image generating section configured to generate an image based on the first and second summed output level differences of each pixel rather than the output level of each pixel responsive to received light intensity.

7. The image capture device of claim 6, wherein the image shifting means moves the image position so that the given point in the image on the light-receiving surface makes a continuous constant velocity circular movement.

8. The image capture device of claim 6, wherein the image capturing means and the image processing means comprise an image capture device main unit;

the optics and the image shifting means comprise a lens unit detachable from the image capture device main unit;

the image capture device main unit outputs data including pixel spacing on the light-receiving surface to the lens unit; and the image shifting means moves the image position based on the data.

9. The image capture device of claim 6, wherein the image capturing means outputs a sync signal in sync with a timing at which the image on the light-receiving surface is captured; and the image shifting means moves the image position based on the sync signal.

10. The image capture device of claim 6, wherein
the image shifting means outputs a sync signal in sync with a timing at which the image position is moved; and
the image capturing means captures the image on the light-receiving surface based on the sync signal.

11. The image capture device of claim 6, wherein the image capturing element is a bolometer or a microbolometer.

12. A method for generating an image in an image capture device with a light-receiving surface, on which pixels are arrayed in a two dimensional matrix in a first alignment direction and in a second alignment direction perpendicular to the first alignment direction, each pixel including an image capturing element for outputting an electrical signal at an output level responsive to received light intensity, and optics capable of forming an image of an object in a position on the light-receiving surface, the method comprising:
   moving an image position on the light-receiving surface in the first alignment direction and the second alignment direction of the pixels on the light-receiving surface;
   capturing respective images on the light-receiving surface before and after movement of the image position on the light-receiving surface;
   calculating a first output level difference between output levels of each pixel in the first alignment direction when respective images on the light-receiving surface are captured by the image capturing means before and after movement of the image position in the first alignment direction, and a second output level difference between output levels of each pixel in the second alignment direction when respective images on the light-receiving surface are captured by the image capturing means before and after movement of the image position in the second alignment direction;
   sequentially summing first output level differences in output levels from respective pixels in the first alignment direction to calculate a first summed output level difference of each pixel in the first alignment direction, and second output level differences in output levels from respective pixels in the second alignment direction to calculate a second summed output level difference of each pixel in the second alignment direction; and
   generating the image based on the first and second summed output level differences of each pixel rather than the output level of each pixel responsive to received light intensity.

13. An infrared camera system comprising:
image capturing means having an light-receiving surface, on which pixels are arrayed, each pixel being composed of an image capturing element for outputting an electrical signal at an output level responsive to received infrared radiation intensity;
optics for forming an image of an object on the light-receiving surface;
image shifting means for moving an image position on the light-receiving surface; and
image processing means for processing images captured by the image capturing means;
wherein
   the image capturing means captures respective images on the light-receiving surface before and after movement of the image position by the image shifting means;
   the pixels on the light-receiving surface are arrayed in a two dimensional matrix in a first alignment direction and in a second alignment direction perpendicular to the first alignment direction;
   the image shifting means causes the image position to move in the first alignment direction of the pixels on the light-receiving surface and in the second alignment direction perpendicular to the first alignment direction; and
the image processing means has
   an output level difference calculating section for calculating a first output level difference between output levels of each pixel in the first alignment direction when respective images on the light-receiving surface are captured by the image capturing means before and after movement of the image position in the first alignment direction, and a second output level difference between output levels of each pixel in the second alignment direction when respective images on the light-receiving surface are captured by the image capturing means before and after movement of the image position in the second alignment direction;
   a summed output level difference calculating section for sequentially summing first output level differences in output levels from respective pixels in the first alignment direction to calculate a first summed output level difference of each pixel in the first alignment direction, and second output level differences in output levels from respective pixels in the second alignment direction to calculate a second summed output level difference of each pixel in the second alignment direction; and
   an image generating section for generating an image based on the first and second summed output level differences of each pixel rather than the output level of each pixel responsive to received light intensity.

14. An interchangeable lens system comprising:
an image capturing device main unit; and
a lens unit removable from the image capturing device main unit;
wherein the image capture device main unit includes
   image capturing means having a light-receiving surface on which arrayed are pixels each composed of an image capturing element for outputting an electrical signal at an output level responsive to received light intensity; and
   image processing means for processing images captured by the image capturing means;
wherein the lens unit includes
   optics for forming an image of an object on the light-receiving surface; and
   an image shifting means for moving an image position on the light-receiving surface;
   wherein the image capturing means captures respective images on the light-receiving surface before and after movement of the image position by the image shifting means;
   the pixels on the light-receiving surface are arrayed in a two dimensional matrix in a first alignment direction and in a second alignment direction perpendicular to the first alignment direction;
   the image shifting means causes the image position to move in the first alignment direction of the pixels on the light-receiving surface and in the second alignment direction perpendicular to the first alignment direction; and
the image processing means has
   an output level difference calculating section for calculating a first output difference between output levels of each pixel in the first alignment direction when respective images on the light-receiving surface are captured by the image capturing means before and after movement of the image position in the first alignment direction, and a second output level difference between output levels of each pixel in the second alignment direction when respective images on the light-receiving surface are captured by the image capturing means before and after movement of the image position in the second alignment direction;

a summed output level calculating section for sequentially summing first output level differences in output levels from respective pixels in the first alignment direction to calculate a first summed output level difference of each pixel in the first alignment direction, and second output level differences in output levels from respective pixels in the second alignment direction to calculate a second summed output level difference of each pixel in the second alignment direction; and an image generating section for generating an image based on the first and second summed output level differences of each pixel rather than the output level of each pixel responsive to received light intensity.

\* \* \* \* \*